United States Patent [19]
Chambers

[11] Patent Number: 5,122,321
[45] Date of Patent: Jun. 16, 1992

[54] METHOD FOR DISPOSING OF GASEOUS MONOMER

[76] Inventor: John E. Chambers, P.O. Box 6747, Greenville, S.C. 29606

[21] Appl. No.: 719,398

[22] Filed: Jun. 24, 1991

Related U.S. Application Data

[62] Division of Ser. No. 541,614, Jun. 21, 1990.

[51] Int. Cl.⁵ .............................................. D01D 1/10
[52] U.S. Cl. ...................................... 264/169; 55/84; 264/211.14
[58] Field of Search ............... 264/169, 176.1, 211.13, 264/211.14, 39; 425/72.2; 55/84

[56] References Cited
U.S. PATENT DOCUMENTS 3,444,587  5/1969  Polovets et al. .................. 425/72.2

FOREIGN PATENT DOCUMENTS

| 153708 | 1/1982 | Fed. Rep. of Germany | 425/72.2 |
| 40-25172 | 11/1965 | Japan | 264/176.1 |
| 179874 | 11/1966 | U.S.S.R. | 264/176.1 |
| 89/03903 | 5/1989 | World Int. Prop. O. | 425/72.2 |

Primary Examiner—Richard L. Chiesa
Assistant Examiner—William J. Matney, Jr.
Attorney, Agent, or Firm—Bailey & Hardaway

[57] ABSTRACT

Method for removing gaseous monomer emitted during the manufacture of polymer fibers include collecting the gaseous monomer in a suction nozzle constructed of smooth polymeric material having low heat conductivity to avoid monomer buildup therein and delivering same upwardly through a water trap to a transport duct which is kept sufficiently wet to receive and remove monomer solids carried in the water which flows by gravity in the duct.

3 Claims, 2 Drawing Sheets

METHOD FOR DISPOSING OF GASEOUS MONOMER

This is a divisional application of application Ser. No. 07/541,614, filed on Jun. 21, 1990, allowed as amended.

BACKGROUND OF THE INVENTION

This invention relates to monomer exhaust systems for use in synthetic fiber manufacture.

During the extrusion of synthetic polymers to make fibers such as nylon, that monomer portion which does not polymerize must be disposed of. It has been the practice in disposing of monomer gas to connect an upper part of the quench cabinets, wherein the monomer gas is formed adjacent the spinnerets, to an exhaust duct thereabove by means of round flexible pipes. A fan in the exhaust duct pulls a vacuum in the pipes. The monomer gas, as it cools, sublimates or collects as a solid and accumulates inside the walls of the pipes and duct and eventually causes clogging problems, which cause production shut down and the necessary clean up in order to get the exhaust system working properly. It is often necessary to melt out the monomer accumulations in the pipes and duct.

Accordingly, it is an important object of this invention to provide an improved method for disposing of gaseous monomer developed during the process of quenching fibers extruded in the spinnerets.

Another important object of the invention is to avoid monomer build up in the ducts and pipes utilized to dispose of quench cabinet monomer gas.

Still another important object of this invention is to provide an improved system for disposing of gaseous monomer in a form adaptable to satisfy environmental concerns.

SUMMARY OF THE INVENTION

The invention contemplates disposing of gaseous monomer developed in the extrusion of plastic fibers wherein air flow is utilized for quenching the extruded fibers prior to winding by providing a plurality of laterally spaced nozzles constructed of a polymer having low heat conductivity each receiving air flow containing gaseous monomer on one end and delivering same in an upwardly directed stream on the other end. A water tight duct receives the upwardly directed air flow streams at longitudinally spaced locations therealong. Spray nozzles are spaced along the duct delivering water for containing the monomer solids for movement responsive to air flow along the duct for removal. An upright connector joins each of the nozzles and the water tight duct for directing the air flow stream into the duct.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate apparatus for disposing of gaseous monomer contained in the fumes emitted in the area adjacent the spinnerets during the manufacture of synthetic fibers. Spaced suction nozzles A for drawing in fumes containing gaseous monomer are constructed of a smooth polymer having sufficiently low heat conductivity to maintain the fumes in the nozzle at an elevated temperature to avoid excessive monomer sublimation and accumulation therein. A transport duct B has sufficient air flow to remove fumes by suction through the nozzles and into the duct. Apparatus C is provided for injecting water into the fumes in the transport duct in sufficient quantity to carry off the solidified monomer therein. Junctions are provided with water traps D between the nozzles and the transport duct delivering the fumes to the transport duct avoiding the back flow of water containing monomer from the transport duct into the nozzles. A mounting provides for the transport duct to be suitably positioned to carry off the water containing monomer by the force of air flowing along the duct. Monomer buildup is avoided through the construction of the nozzles and the wetting of the duct to carry off the collected monomer by gravity.

A series of quench cabinets are schematically illustrated at 10, each having a number of strands of extruded fiber 11 proceeding from the bottom thereof. Adjacent the tops 12 of the cabinets, the nozzles A are illustrated as being in a position to draw off monomer exhaust from within the cabinets above a front cabinet wall 13.

Figure 1:
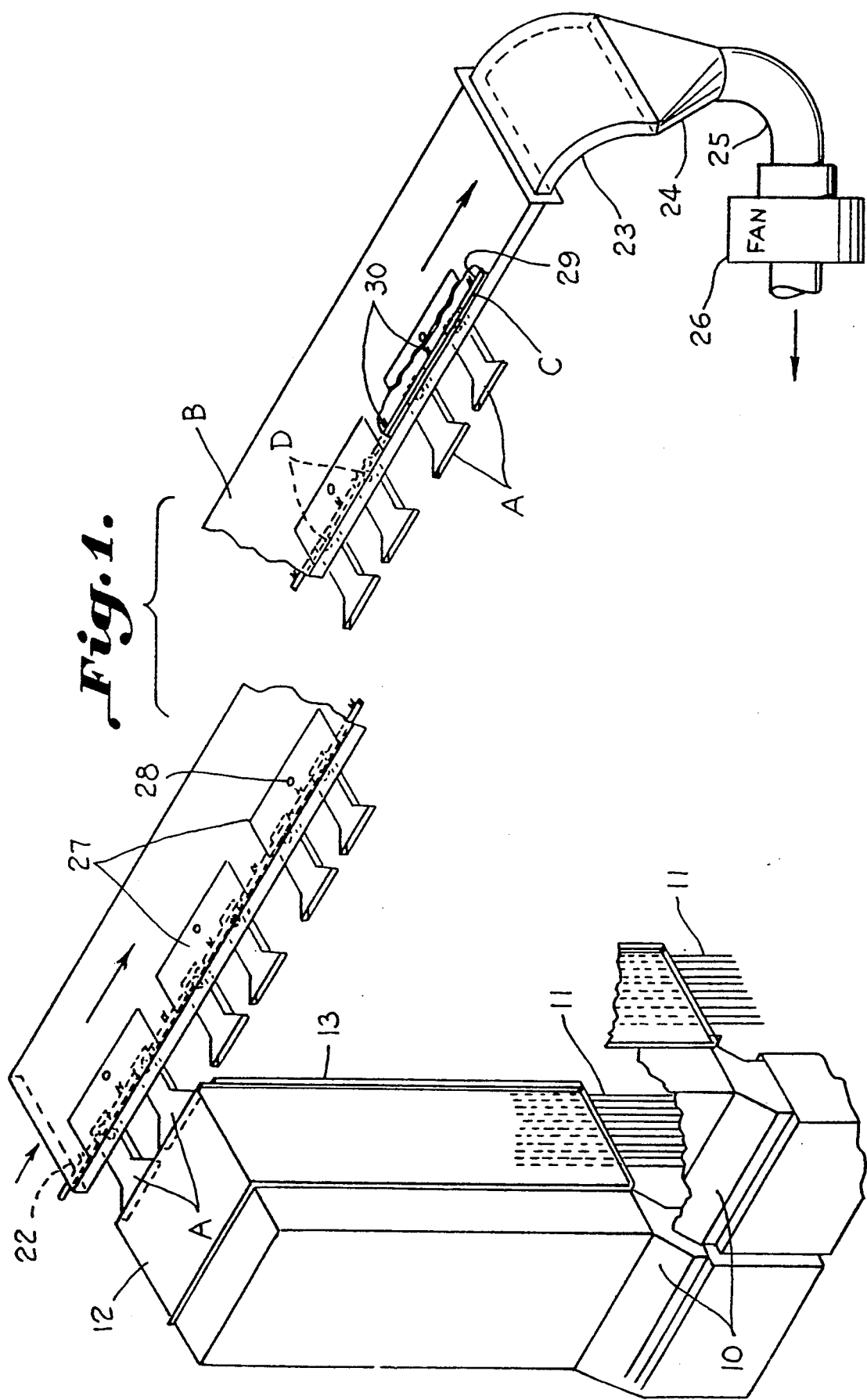
FIG. 1 is a perspective view schematically illustrating a monomer exhaust system, constructed in accordance with the invention, installed upon quench cabinets.
Figure 2:
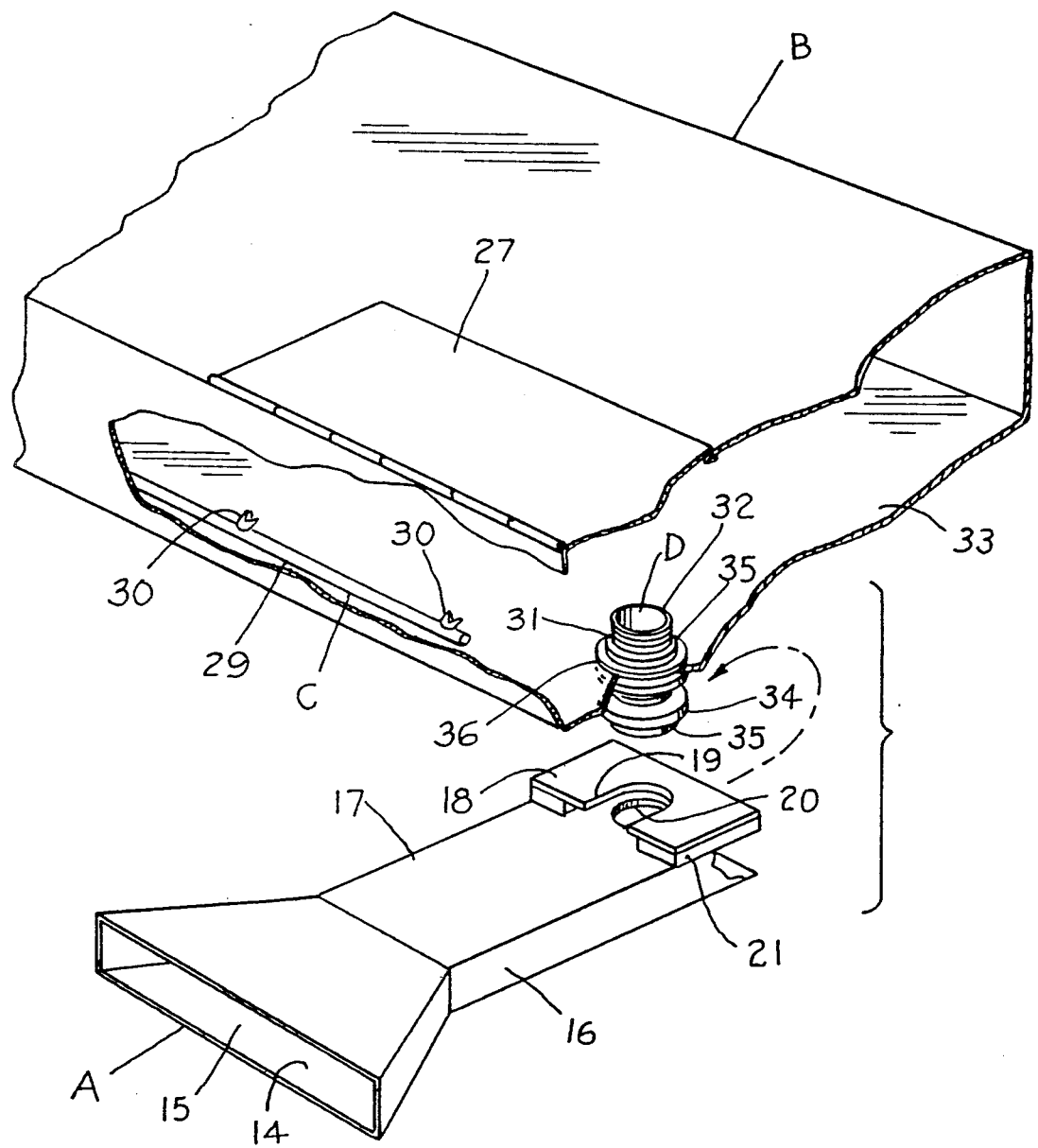
FIG. 2 is an enlarged perspective view illustrating a nozzle connected to an exhaust duct in accordance with the invention.

The nozzles A are best illustrated in FIG. 2 and include an enlarged open end 14 formed by an expanded section 15 which converges toward a connector 16 illustrated as being of uniform cross section. A seal is formed by a plate 18 having a slot 19 cut therein opening toward the expanded or flared end of the nozzles and which accommodates an opening 20 in the upper surface 17 through which monomer gas is passed upwardly into the exhaust duct B. Spacer blocks 21 are provided for positioning the plate 18 above the upper surface 17 of the nozzles in order to accommodate a base of a stand pipe which forms a part of the water trap D.

The transport duct B is open on one end as at 22 and is connected through a curved duct 23 and a square to round 24 and through a circular pipe 25 to an exhaust fan 26. It will be noted that a number of spaced service access doors 27 having handles 28 are provided along the duct for servicing the junctures between the nozzles and the duct for readily removably receiving the nozzles and for cleaning the duct and for general service work.

The apparatus C for injecting water into the transport duct includes a longitudinal pipe 29 having a number of nozzles 30 for providing a spray of water across the interior of the duct and, in particular, across the monomer gas laden air. It will be noted that the exhaust duct B is supported by the duct work and any other suitable support structure in order to be positioned substantially horizontally as shown so that air flow will induce flow of the water into which the monomer has sublimated toward the exhaust duct work for removal by gravity.

The water trap D includes a threaded stand pipe 31 which has an upper surface 32 extending above the surface of any liquid accumulations adjacent the bottom 33 of the transport or exhaust duct B. A seal is provided by a lower gasket 34 which is tightened against the bottom 33 as by a spud nut 35. A similar nut 35 may be utilized to tighten the gasket 36 against the upper surface of the bottom 33.

OPERATION

It is thus seen that gravity causes the flow of water containing the monomer to flow downwardly and through the exhaust duct work. The monomer solids are kept in the spray water collected in the transport duct.

It is important to note that the nozzles are constructed of a material having a low thermal conductivity such as suitable polymer, for example, LEXAN plastic or LUCITE plastic, so as to be smooth and non-corrosive. It is important that the surface be smooth so as to be resistant to seeding of the monomer gas as may cause excessive monomer collections to build up within the nozzles. Since the material is of low thermal conductivity, little heat transfer is permitted by the nozzles in respect to flow of monomer gas passing therethrough to the transport duct reducing any tendency toward monomer buildup.

It is thus seen that a system of disposing of gaseous monomer collected adjacent the spinnerets of a fiber extrusion process has been provided so as to avoid monomer build up in the duct work. The expensive maintenance work normally associated with cleaning the duct work and disposing of the monomer collected in the duct work has been avoided. Another important advantage is achieved because the water carrying the monomer solids may be more easily disposed of.

As illustrated the air and fumes enter a suction nozzle and travel through the suction nozzles to an exhaust duct. The exhaust duct inlet extends into the duct to prevent water leakage even when the nozzle is removed. A water spray scrubs monomer fumes from the air stream, and the water/monomer solution drains to an effluent handling system.

While a preferred embodiment of the invention has been described using specific terms, such description is for illustrative purposes only, and it is to be understood that changes and variations may be made without departing from the spirit or scope of the following claims.

What is claimed is:

1. The method of disposing of monomer contained in the fumes emitted in the area adjacent the spinnerets during the manufacture of synthetic fibers comprising the steps of:

collecting fumes containing gaseous monomer in suction nozzles constructed of a polymer having low heat conductivity such as to maintain the fumes in said nozzles at a temperature above about 150° F;

providing a transport duct above said nozzles having sufficient air flow to remove fumes from said nozzles;

wetting said fumes in said transport duct with water in sufficient quantity to carry off said monomer;

delivering said fumes from the nozzles to the transport duct through junctions;

preventing the flow of water containing said monomer from the transport duct to the nozzles with a water trap disposed between said nozzles and said transport duct; and maintaining said transport duct at a suitable position sufficient to permit the water containing said monomer to be carried off in the duct;

whereby monomer is disposed of avoiding monomer buildup on surfaces contacted by said fumes.

2. The method set forth in claim 1 including spraying said fumes in said transport duct with water.

3. The method of disposing of monomer contained in the fumes emitted in the area adjacent the spinnerets during the manufacture of synthetic fibers comprising the steps of:

collecting fumes containing gaseous monomer in suction nozzles;

providing a transport duct above said nozzles having sufficient air flow to remove fumes from said nozzles;

wetting said transport duct with water in sufficient quantity to carry off said monomer;

delivering said fumes from the nozzles to the transport duct through junctions;

preventing the flow of water containing said monomer from the transport duct to the nozzles with a water trap disposed between said nozzles and said transport duct; and maintaining said transport duct at such a suitable position sufficient to permit the water containing said monomer to be carried off in the duct;

whereby monomer is disposed of avoiding monomer buildup on surfaces contacted by said fumes.

* * * * *